United States Patent
Graser, Jr.

[11] 3,884,553
[45] May 20, 1975

[54] OPTICAL DISPLAY SYSTEM WITH IMPROVED SPECTRAL EFFICIENCY

[75] Inventor: Michael Graser, Jr., Bedford, Mass.

[73] Assignee: Technical Operations Incorporated, Burlington, Mass.

[22] Filed: Jan. 16, 1974

[21] Appl. No.: 433,903

[52] U.S. Cl............. 350/162 SF; 350/3.5; 350/96 B
[51] Int. Cl...................... G02b 5/18; G02b 27/38
[58] Field of Search............ 350/162 SF, 3.5, 96 B; 358/2, 6, 9, 47

[56] References Cited
UNITED STATES PATENTS

| | | | |
|---|---|---|---|
| 3,532,873 | 10/1970 | Batson et al. | 350/96 B |
| 3,549,238 | 12/1970 | Graser | 350/162 SF |
| 3,561,859 | 2/1971 | Heckscher et al. | 350/162 SF |
| 3,576,430 | 4/1971 | Fickenscher | 350/96 B |

*Primary Examiner*—Ronald J. Stern
*Assistant Examiner*—Jon W. Henry
*Attorney, Agent, or Firm*—Alfred H. Rosen; Frank A. Steinhilper

[57] ABSTRACT

An optical display system of the Fourier transform type for reconstructing spatial carrier modulated images using an off-axis light source to place a harmonic order diffraction spectrum on the system optical axis, in which the light source is composed of spectral components of differing wavelengths, a component of longer wavelength being displaced further from the axis than a component of shorter wavelength.

21 Claims, 5 Drawing Figures

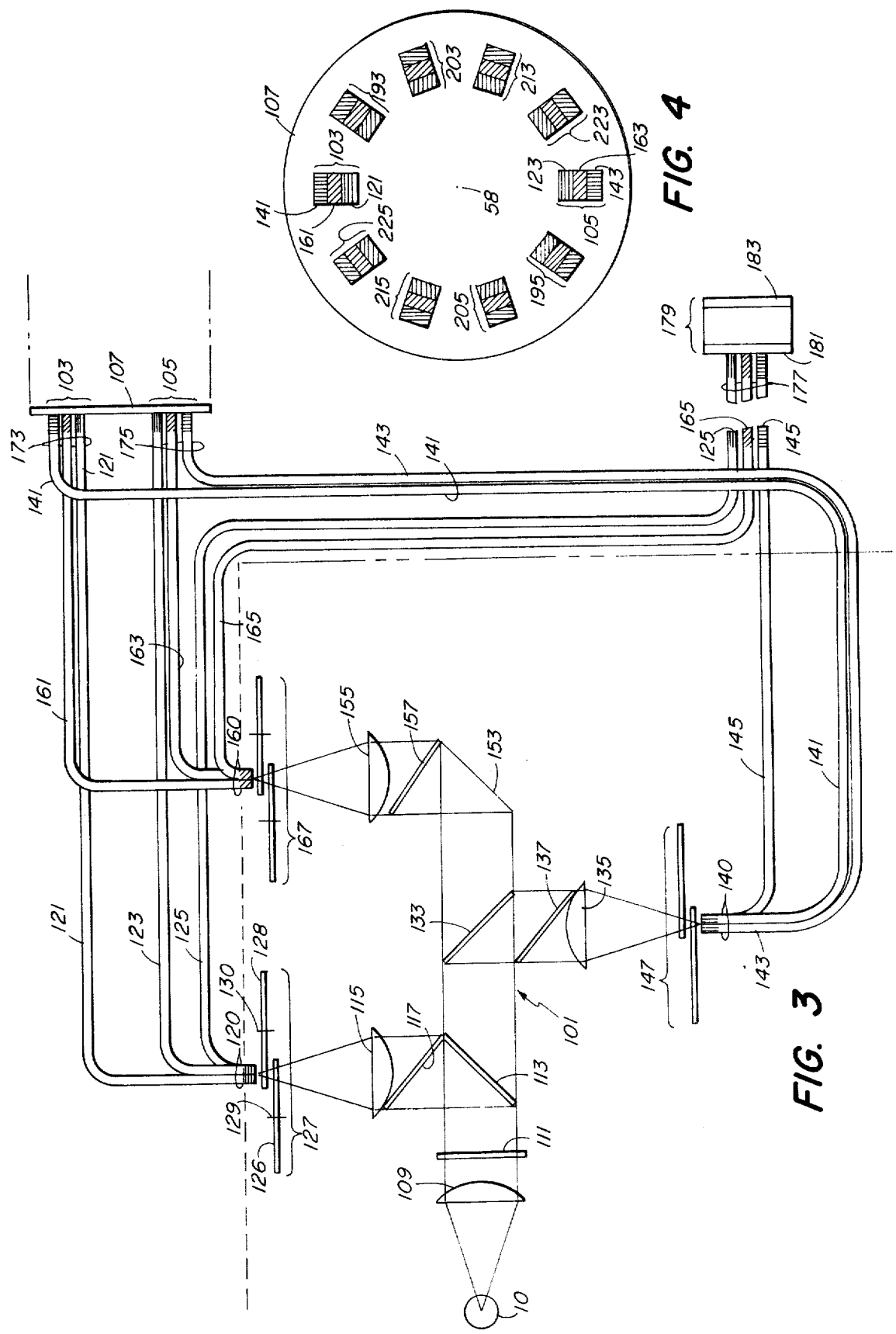

OPTICAL DISPLAY SYSTEM WITH IMPROVED SPECTRAL EFFICIENCY

INTRODUCTION

This invention relates to optical apparatus for reconstructing an image (real or virtual) from a record of that image multiplied with spatially periodic modulation; typically such modulation takes the form of a diffraction grating having a unique orientation. More particularly, the invention is concerned with such methods and apparatus which employ light sources displaced from the optical axis to illuminate the record at such a diffraction angle that a desired order (typically a first order) of the diffraction pattern of a selected record image falls on the optical axis, and an iris of an objective optical subsystem can be used as the transform plane filter, and one or more selected record images can be reconstructed by filtering a selected diffraction order of each through the same iris.

CROSS-REFERENCE TO RELATED PATENTS

This invention improves optical image reconstruction system of the kind that is described in U.S. Pat. Nos. 3,561,859 and 3,549,238, both of which are owned by the assignee of the present application. Generally, such systems comprise an optical viewing or display apparatus having an optical axis, means for supporting on the axis a record of one or more component record images each modulating a spatial carrier characterized by a unique orientation relative to the carriers of the other components, and light-source means for illuminating the record with light beams effectively emanating from a plurality of angularly separated sources, there being one or a pair of such effective light sources for each of said component record images. The source or pair of sources for each such component is or are angled obliquely to the axis, and aligned azimuthally with respect to the carrier orientation of said such component, so as to locate a predetermined harmonic diffraction spectrum of said such component on the optical axis in a Fourier transform space.

BACKGROUND OF THE INVENTION

The diffraction angle of a grating is proportional to the wavelength of the light that is used to illuminate it. Thus, red light is diffracted further (i.e.: angularly more) than blue light. If diffracted light must fall on the optical axis, the source of red light has to be displaced further off-axis than the source of blue light, for example. The referenced patents recognize this fact, and the solution taught in them is to locate light sources of different colors at different azimuthal orientations and at different radial displacements from the optical axis of the image reconstruction system. This constraint limits the illumination of each component record image to a fixed narrow spectral band. One method of utilizing wide spactral band illumination is to use slot-shaped apertures extending radially to accomodate varying the color of each light source, but that solution degrades the efficiency of spatial filtering.

GENERAL NATURE OF THE INVENTION

In the present invention, a radially-distributed array of colored light sources is provided for each image-modulating grating contained in a stored record of one or several individually spatially-modulated images. An array of three colored sources — red, green and blue, with the red located radially furthest from the axis and the blue nearest to the axis — is a preferred example. This array is fixed relative to the optical axis, each color being uniquely located as determined by the diffraction grating spatial periodicity and optical parameters of the system. A trifurcated bundle of fiber optics conductors, with its ends providing the light sources having respective rectangular cross-sections, has been found to be efficient and convenient for packing colored light sources closely together in the radial direction. The input ends of such a trifurcated bundle which receive the individually colored light inputs are physically separate from each other, so that each may be coupled to a separate source of spectrally filtered light. Using this technique, a plurality of off-axis light sources are provided, each of which can be made to provide light of any desired hue or color at an optimum radial distance from the optical axis of the modulated-image reconstruction system employing them. Neutral density filters can be employed in known fashion to adjust the intensity of each input source of each spectral component thereof. The invention is useful to reconstruct overlapping images as well as modulated images occupying mutually-exclusive portions of a record.

BRIEF DESCRIPTION OF THE DRAWINGS

FIG. 3 schematically illustrates a modification of FIG. 1 to include a plurality of diametrically-opposed pairs of spectrally-variable off-axis light sources angularly spaced around the optical axis of the modulated-image reconstruction system;

FIG. 4 is a plan view of the Transform Filter in FIG. 3; and

DETAILED DESCRIPTION OF THE DRAWINGS

Figure 1:
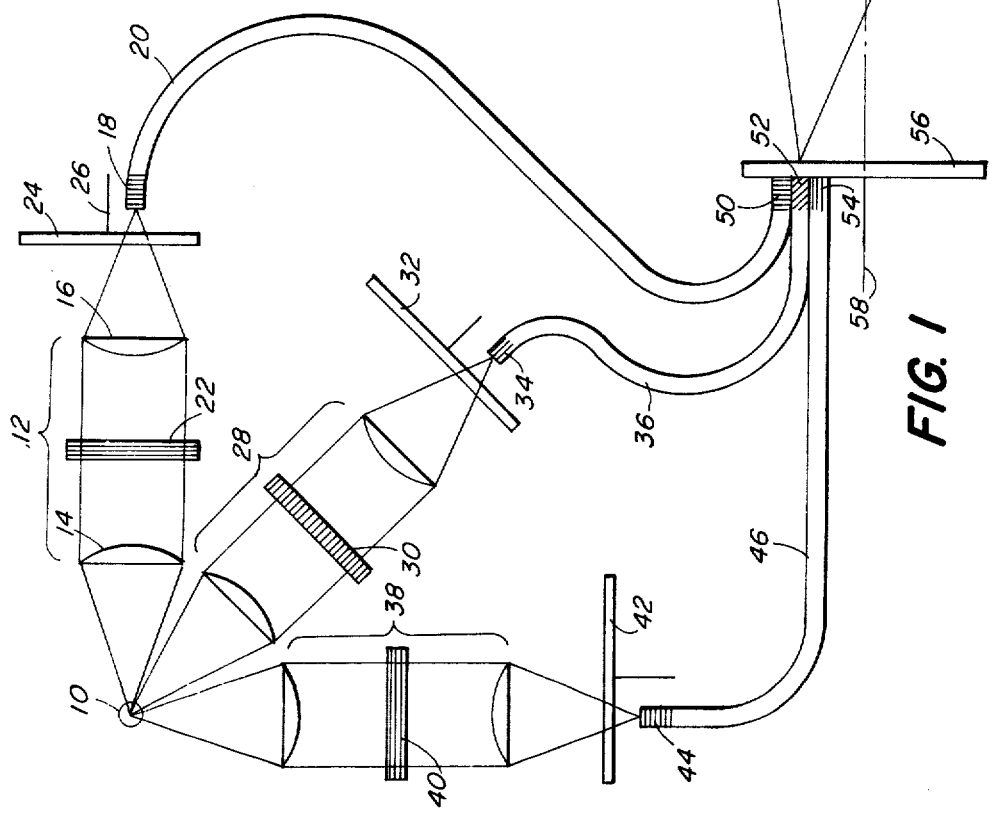
FIG. 1 is a schematic layout of an optical system showing a typical trifurcated fiber optics bundle for bringing light from three differently-colored input sources to a single position in an off-axis light source modulated-image reconstruction system.

In FIG. 1 a lamp 10 supplies white light for the optical system. A condenser system 12 comprised of two condenser lenses 14, 16 focuses light from the source on the receiving end 18 of a first fiber optics light conductor 20. A red filter 22, preferably dichroic, is located between the condenser lenses 14, 16, and a Neutral Density variable attenuator 24 rotatable on an axis 26 serves to adjust the intensity of light reaching the light conductor 20. This is a source of red light. A source of green light comprising a condenser system 28, green filter 30 and variable ND filter 32 focuses light from the lamp 10 on the receiving end 34 of a second light conductor 36. A source of blue light comprising a condenser system 38, blue filter 40 and variable N.D. filter 42 focuses light from the lamp 10 on the receiving end 44 of a third light conductor 46. The three light conductors 20, 36 and 46 are brought together in a trifurcated bundle at their respective output ends 50, 52 and 54, where they are held fixed in a transform filter 56. In this position, the group of three output ends furnish an off-axis light source 55 for a reconstruction system of the kind described in the referenced patents.

The optical axis of the reconstruction system is along line 58—58.

Figure 2:
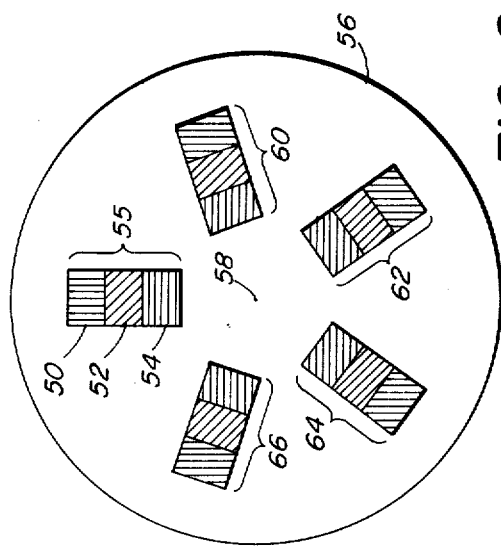
FIG. 2 is a plan view of the transform filter in FIG. 1.

Referring to FIG. 2, the off-axis light source 55 at the transform filter 56 is seen to comprise three rectangular spectral component sources 50, 52 and 54 of, respectively, red, green and blue light. Each light-conductor output end is rectangular in cross-section and each touches its neighbor or neighbors, so that all three are packed closely together and the off-axis light source 55 position can be filled to the maximum with light. For obvious reasons, the red component 50 is furthest from the optical axis 58, and the blue component 54 is nearest to the optical axis. With this arrangement, light of any desired color can be supplied in the off-axis position 55 at the optimum distance from the optical axis, entirely with optical manipulations, and with no requirement to manipulate the location of the light source 55. As appears in the referenced patents, each spectral component is preferably located so that a first-order of its diffraction pattern, with reference to a modulated stored image suitable for use in the system, will fall on the optical axis 58—58. In like manner, several additional similar off-axis sources of light 60, 62, 64 and 66 can be provided in the transform filter. While the spectral components have been illustrated as rectangular in shape, each may have an other shape, for example that of an arc-form "rectangle" in which the long sides are arcuate rather than straight. The term rectangular as used herein is intended to include that possibility, without limitation.

Referring again to FIG. 1, the off-axis light source 55, and similar sources 60–66 inclusive, if present, may illuminate an image reconstruction system comprising a transform lens 70, a projection lens 72, a stop 74 and a screen 76 for displaying a real image. A record 78 bearing a spatially-modulated stored image may be located on the far side of the transform lens from the transform filter. It is assumed for the purposes of this illustration that the record 78 bears a diffraction grating modulation the lines of which are directed normal to the drawing. With this arrangement, as is known, zero-order diffracted light from the light source 55 will be directed to fall outside the aperture of the stop 74, for example at a position 80, and a first-order diffraction pattern will fall in the stop at a region 82 as is represented by the dashed lines 84, 86. First-order diffracted light from each spectral component 50, 52, 54 will fall essentially on this same region 82, so that substantially all the light that is available from the off-axis source 55 can be expected to contribute to first-order illumination of the stop 74. Thus, the off-axis light source 55 can contribute light of more than one color, and the aperture stop 74 can thereby be illuminated with spectral components that will make up any desired color or hue.

The projection lens 72 will form on the screen 76 an unmodulated image of the stored modulated record that bears the above-mentioned diffraction grating having lines directed normal to the drawing. In like manner, each of the additional off-axis multi-spectral light sources 60, 62, 64 and 66 can be used to demodulate a modulated image stored in the record 78 provided the modulation bears the proper azimuthal orientation for the particular source used, and of course, has the required spatial periodicity to deposit its first-order (or other desired-order) diffraction spectrum in the aperture stop 74. It matters not whether the images stored in the record 78 overlap each other or occupy mutually-exclusive portions of the record.

In FIG. 3 a single optical subassembly 101 provides a source of red, green and blue light components to a pair of diametrically-opposed off-axis light sources 103 and 105, respectively, located in a transform filter 107 which is the equivalent of the transform filter 56 in FIGS. 1 and 2. White light from the lamp 10 passes through a condenser lens 109 and a heat filter 111 to a first spectral filter 113 (preferably dichroic) which reflects blue light to a second condenser lens 115 through a blue trim filter 117. The first and second condenser lenses 109 and 115 form a first condenser system for focusing the blue light component on a first bundle 120 of three light conductors 121, 123 and 125 through a neutral-density variable light attenuator 127. The three light conductors 121, 123 and 125 may be grouped side-by-side as shown, or may be random-mixed at the bundle 120. The attenuator in this example is shown as a pair of discs 126 and 128 each rotatable on a shaft 129, 130, respectively. Conveniently, one disc 126 is calibrated in 10 "units" of attenuation for a complete revolution while the other 128 is calibrated in steps each of which is equal to ten units of the first so as to change its attenuation factor in steps of 10 units each.

Light that passes through the first spectral filter 113 next encounters a second spectral filter 133 which reflects red light to a third condenser lens 135 through a red trim filter 137. The first and third condenser lenses 109 and 135 form a second condenser system for focusing the red light component on a second bundle 140 of three light conductors 141, 143 and 145 through a neutral-density variable light attenuator 147.

Light that passes through the second spectral filter 133 next encounters a third spectral filter 153 which reflects green light to a fourth condenser lens 155 through a green trim filter 157. The first and fourth condenser lenses 109 and 155 form a third condenser system for focusing the green light component on a third bundle 160 of three light conductors 161, 163 and 165 through a neutral-density variable light attenuator 167. The second and third bundles 140 and 160 can also be made of side-by-side or random-mixed groupings of fibers.

A first blue light conductor 121, a first green light conductor 161 and a first red light conductor 141 are brought together in a first tirfurcated bundle 173 to form a first one 103 of the pair of off-axis light sources 103, 105. A second blue light conductor 123, and a second green light conductor 163 and a second red light conductor 143 are brought together in a second trifurcated bundle 175 to form the second one 105 of these two off-axis light sources. The third blue light conductor 125, the third green light conductor 165 and the third red light conductor 145 are brought together in a third trifurcated bundle 177 which leads to a visual monitor 179 comprised of two spaced-apart sheets of opal glass 181, 183.

Each off-axis light source 103, 105 in the illustrated diametrically-opposed pair is located in the transform filter assembly so as to deposit a first-order (or other desired-order) diffraction spectrum in the aperture stop 74 when used to demodulate a modulated image stored in the record 78 provided the modulation bears the proper azimuthal orientation for both sources and has appropriate spatial periodicity. As is known to those skilled in the art, each light source 103, 105 functions in the same manner as the single source 55 in FIG. 1, one being opposed 180° to the other so that zero-order light from each will fall outside the aperture of the stop 74, on opposite sides of the aperture.

The monitor 179 is an optional component of the light-source system, which is a convenience enabling the operator to see on the remote opal glass 183 a composite of the three spectral components that are present in each of the off-axis light sources. This will enable the operator to judge in advance what color or hue will be given to the reconstructed image that will be projected on the screen 76.

The optical subassembly 101 is more economical in its requirements for condenser lenses and space than is the arrangement shown in FIG. 1. Using the arrangement shown in FIG. 3, several subassemblies like the one shown can be arrayed around the lamp 10, to provide additional pairs of diametrically-opposed off-axis light sources, 193, 195; 203, 205; 213, 215; and 223, 225; arrayed around the optical axis 58 in the transform filter asembly 107, as is shown in FIG. 4. Each such pair will constitute the input light to a separate optical channel, and can be used to illuminate a uniquely spatially-modulated record image; and each uniquely-modulated image can be illuminated and reconstructed separately or simultaneously with one or more of the others. A separate monitor like the illustrated monitor 179, can (if desired) be provided for each channel.

Figure 5:
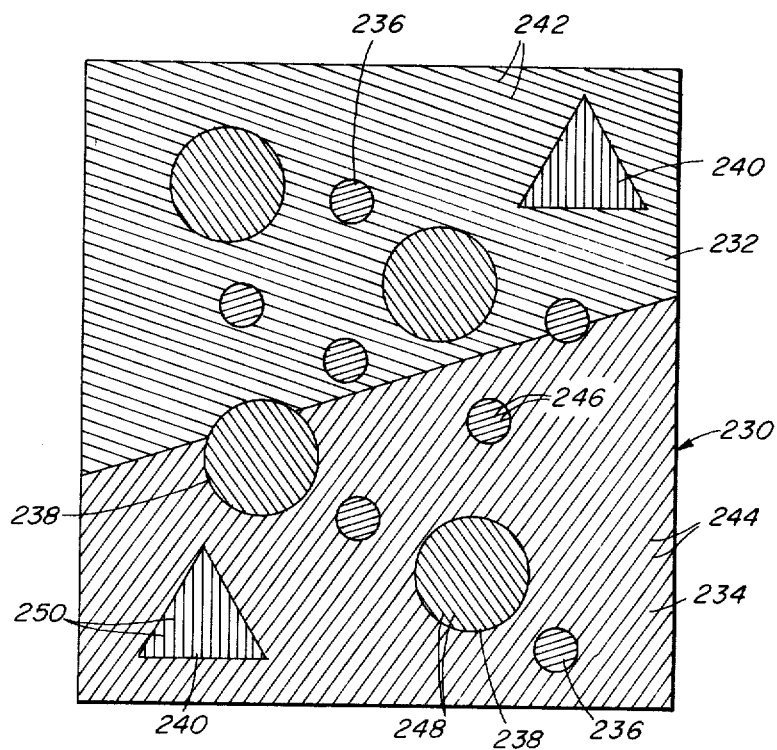
FIG. 5 is a schematic illustration of a record that is useful in combination with systems of the invention.

Display systems according to the invention are particularly suitable to reconstruct arbitrarily-colored reproductions of patterns and designs which are recorded as uniquely-modulated mutually-exclusive area portions of a single record. Such a record may, for example, take the form of a transparency having five elements of design in which it is desired to assign an arbitrary color or hue to each element separately, and the "colors" may include black and white. A schematic illustration of such a record is shown in FIG. 5. A rectangular field 230 is divided into two parts 232 and 234. Rampant on the field are a random array of small polka dots 236, a random array of larger polka dots 238, and a few triangles 240. The five components of this design are the two field parts 232, 234, the array of small dots 236, the array of larger dots 238 and the triangles 240. Each component occupies exclusively a portion of the entire field 230. No component overlaps the other. Each component is spatially encoded with a diffraction grating 242, 244, 246, 248 or 250, respectively. The lines of each grating have a unique orientation in the record. Conveniently the spacing between orientations is 36°. The record may be transparent, and the gratings are preferably phase gratings, although they may be amplitude gratings all having lines of the same color such as black.

If the record 230 is put in place of the record 78 in the system of FIG. 1, or the same as modified by FIG. 3, each component of it can be reproduced separately or with one or more of the others, and projected for view on the screen 76. Each component can be given any desired color or hue, independently of the others. If the color of a record component is desired to be white then the spectral components of the illuminating off-axis light source can be mixed to provide white light, as in the lamp 10. If a record component is to be viewed as "black", then the attenuator in the optical channel for that component will be set for complete attenuation of the illuminating light source.

While in FIG. 3, the receiving ends of the light conductors in the bundles 120, 140 and 160 may advantageously be random-mixed, the output ends of the light conductors at the light sources 103, 105, etc., are grouped side-by-side, as shown, in order to assure displacement of each spectral component the proper distance from the system axis. Moreover, while it is clear that the modes of illuminating the receiving ends of the light conductors that are shown in FIGS. 1 and 5 can be interchanged, it should also be understood that other modes of illumination can be employed. Since the referenced patent teach how to derive several channels from a single primary light source, it is not necessary to illustrate additional light-channels, in FIG. 1 or FIG. 3, between the primary light source 10 and each individual off-axis source or pair of sources shown in FIG. 2 or FIG. 4.

I claim:

1. In Fourier transform optical apparatus for reconstructing on an optical axis an image from a record of that image located on said axis and which bears spatially periodic modulation with a unique carrier having a unique orientation in the record and relative to said axis, using light source means displaced a fixed distance from said axis at a prescribed azimuthal angle about said axis relative to said orientation to illuminate the record with a beam of light at such a diffraction angle to said axis that $n$-th order diffracted light from said beam falls on said axis ($n$ being an integer greater than zero), said apparatus including a spatial filter mask with an aperture located on said axis for passing said $n$-th order diffracted light while substantially blocking zero-order light and light in diffraction orders other than said $n$-th order, for forming said image with said $n$-th order diffracted light, the improvement in light source means which comprises at least a first source of light in a first spectral range and a second source of light in a second spectral range that is different from said first spectral range, means locating said first source a first fixed distance from said axis at said azimuthal angle so as to illuminate the entire record with light in said first spectral range directed toward said axis at a first diffraction angle such that said unique carrier will diffract the light in said first spectral range so that only the $n$-th order diffracted light will pass through said aperture, means locating said second source a second fixed distance from said axis at said azimuthal angle so as to illuminate the entire record with light in said second spectral range directed toward said axis at a second diffraction angle such that said unique carrier will diffract the light in said second spectral range also so that only the $n$-th order diffracted light will pass through said aperture, and means to vary the relative intensities of said source or sources of light at the same azimuthal angle about said axis for controlling the effective color of light illuminating said image.

2. Apparatus according to claim 1 in which each of said light sources has a crosssection that is substantially rectangular with its long sides each tangent to or substantially following an arc centered on said axis.

3. Apparatus according to claim 1 including in association with each light source a separately-controlled neutral density variable light attenuator for independently adjusting the intensity of the light that is available from each of said light sources.

4. Apparatus according to claim 1 including three light sources in which said light sources provide, respectively, red, green and blue light, the source of the red light being furthest from said axis and contiguous to the source of the green light, and the source of the blue light being nearest to said axis and contiguous to the source of the green light.

5. Apparatus according to claim 3 including three light sources, in which said light sources provide, respectively, red, green and blue light, the source of red light being furthest from said axis and contiguous to the source of green light, and the source of blue light being nearest to said axis and contiguous to the source of green light.

6. Apparatus according to claim 1 comprising a separate optical light conductor means for each light source, each conductor having an input end for receiving light and an output end located in said apparatus to provide one of said light sources, said conductors being together side-by-side at their output ends, and being separated each from all the others at their input ends, a separate input of light optically coupled to each input end, and means to limit each of said separate inputs to a unique one of said spectral ranges.

7. Apparatus according to claim 6 in which said output ends of said conductors are each substantially rectangular in cross section.

8. Apparatus according to claim 7 including three light sources, in which said light sources provide, respectively, red, green and blue light, the output end of the green-light conductor being located between the output ends of the red-light conductor and the blue-light conductor, said output ends being arrayed on a radius extending from said axis at said azimuthal angle, the output end for blue light being nearest to said axis.

9. Apparatus according to claim 6 including between each of said input ends and its source of light input a separately-controllable neutral density variable light attenuator.

10. Apparatus according to claim 1 including means supplying white light, means to divide said white light into spectral components, each component, respectively, being light in one of said spectral ranges, and means providing the light of one component in the location of the spectrally-corresponding one of said light sources.

11. Apparatus according to claim 6 including means supplying white light, means to divide said white light into spectral components of which each component, respectively, is light in one of said spectral ranges, and means to couple each of said components as one of said separate inputs to a unique one of said input ends.

12. In an apparatus according to claim 1, a pair of said first sources diametrically-opposed about and equi-distant from said axis, and a pair of said second sources diametrically-opposed about and equidistant from said axis, so as to provide in each spectral range two similar light beams incident to said axis, one at said azimuthal angle and the other 180° therefrom.

13. Apparatus according to claim 12 wherein each of said sources is substantially rectangular with its long sides each tangent to or substantially following an arc centered on said axis.

14. Apparatus according to claim 12 comprising a separate optical light conductor means for each of said first and second light sources in each of said spectral ranges, each conductor having an input end for receiving light and an output end located in said apparatus to provide one of said light sources, a conductor for each of said light sources in one of said spectral ranges being together side-by-side at its output end with a conductor for each of said light sources in the other of said spectral range or ranges, said conductors for each of said spectral ranges being joined together at their input ends in a bundle that is physically separated from the bundles of input ends of conductors for the other spectral ranges, a separate input of light optically coupled to each of said bundles of input ends, and means to limit each of said separate inputs to a unique one of said spectral ranges.

15. Apparatus according to claim 14 including a light monitor, and an additional fiber-optics light conductor extending between each of said bundles and said monitor.

16. Apparatus according to claim 14 including between each of said bundles and its source of light input a separately-controllable neutral density variable light attenuator.

17. Apparatus according to claim 14 including means supplying white light, optical means to divide said white light into spectral components, each component, respectively, being light in one of said spectral ranges, and means to couple each of said components as input to a unique one of said bundles.

18. Apparatus according to claim 12 including a plurality of light channels each composed of a pair of first and second light sources, each pair being located on a line that coincides with an azimuthal angle that is uniquely oriented about said axis, for illuminating a like plurality of periodic modulations in a record, each with light that is separately controllable in color and intensity.

19. Apparatus according to claim 18 comprising in each of said pairs of first and second light sources a separate optical light conductor means for each of said light sources, each conductor having an input end for receiving light and an output end located in said apparatus to provide one of said light sources, in each member of each pair in each channel a conductor for each of said light sources in one of said spectral ranges being together side-by-side at its output end with a conductor for each of said light sources in the other of said spectral range or ranges, said conductors for each of said spectral ranges in each channel being joined together at their input ends in a bundle that is physically separated from the bundles of input ends of conductors for the other spectral ranges in that channel and from the bundles of input ends of conductors for all other channels, a separate input of light optically coupled to each bundle of input ends, and means to limit each of said separate inputs in each channel to a unique one of said spectral components.

20. Apparatus according to claim 19 including means supplying white light, a separate optical means in each of said channels to receive said white light and to divide the received white light into said spectral components for that channel, and means in each channel to couple each of said components as input to a unique one of said bundles in that channel.

21. Apparatus according to claim 1, including an optical system for providing a plurality of spectrally-unique light components one in each of said respective spectral ranges, from a source of light having spectral bandwidth encompassing all of said components, means to direct light from such a source when present to spectral selection means for deriving said components from said source of light, means to direct each component on a unique path that is spatially separated from the paths of the remaining components, and means to supply the light of each component for use as one of said light sources in said Fourier transform optical apparatus.

* * * * *